(No Model.)

J. W. McDONOUGH.
TELEPHONE.

No. 250,827. Patented Dec. 13, 1881.

Attest:
F. W. Howard
J. E. Clark

Inventor:
James W. McDonough
by H. C. Townsend
Atty.

UNITED STATES PATENT OFFICE.

JAMES W. McDONOUGH, OF CHICAGO, ILLINOIS, ASSIGNOR TO LOGAN C. MURRAY, OF NEW YORK.

TELEPHONE.

SPECIFICATION forming part of Letters Patent No. 250,827, dated December 13, 1881.

Application filed May 21, 1881. (No model.)

*To all whom it may concern:*

Be it known that I, JAMES W. McDONOUGH, of the city of Chicago, in the county of Cook and State of Illinois, invented a new and useful Telephone, (for which I made an application for patent April 10, 1876;) and I do hereby declare the following to be a full, clear, and exact description thereof, which will enable others skilled in the art to which my invention appertains to make and use the same, reference being had to the accompanying drawings.

The general object of my invention, as I have set forth in my original application, is to provide a means for transmitting articulate sounds from one place to another through the medium of electricity; but the part of my invention to which this present division of my said application appertains consists in a certain combination of parts set forth in the claim at the end of this schedule.

In other divisions of my said application of April 10, 1876, filed at an even date with this present one, I have specified and claimed other combinations or subject-matter, which, so far as this division is concerned, are not here claimed, but are specified at the end of this schedule.

In order that persons skilled in the art may understand, make, and use my present invention, I will proceed to describe the manner in which I have constructed and combined it with the other parts of my telephone apparatus.

Figure 1:
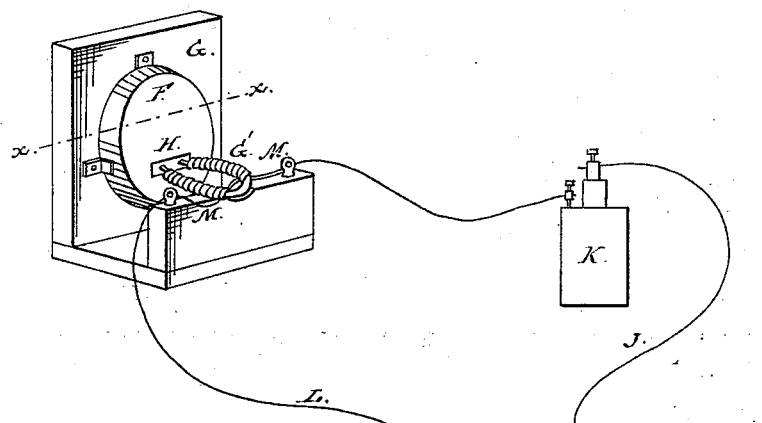
Figure 2:
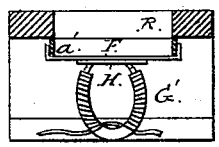
Figure 3:
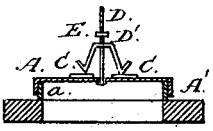
Figure 4:
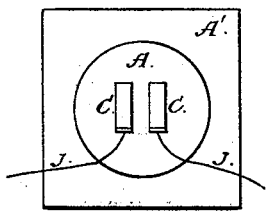

Figure 1 represents a perspective view of a telephone-receiver embodying the invention herein claimed joined in circuit with the telephone-transmitter. Fig. 2 represents a horizontal section of the same, taken on the line $x\ x$, drawn across Fig. 1. Fig. 3 represents a vertical transverse section of the transmitter, taken on the line $y\ y$, Fig. 1; and Fig. 4 represents a general plan or top view of the transmitter with the circuit-controller removed.

Like letters of reference represent like parts.

In the drawings, A represents the transmitting membrane or apparatus, composed of vellum or any suitable material that is sensitive to the vibrations of sound, which is stretched upon a metal hoop or band, $a$, attached to the bed A' by angle-pieces T, Fig. 1.

C C are metal plates, of German silver or such like material, attached to the upper surface of the membrane A each side of its center or point of greatest range of vibration and insulated from each other.

D is a metal bolt permanently attached at its lower end to said membrane A, centrally between plates C C and insulated from them.

D' is the circuit-controller, which consists of an arch-shaped piece of German silver or like material, held in position by the bolt D, which passes through its center, and bent upward at each end from the membrane A, as shown in Fig. 3, so as to form depending V-shaped legs, adapted to rest upon the respective plates C C and to make contact between part of their granular surfaces and the granular surfaces of the plates.

E is a regulating-nut for adjustably controlling or limiting the movements of the circuit-controller.

The receiving membrane or apparatus, which is also composed of vellum or any suitable material that is sensitive to the vibrations of sound, is connected to a rigid circumferential rim or band, $a'$, of metal, by means of which it is removably held through the angle-pieces shown, or in any other suitable manner, against the inner side of the end block or piece, G, and directly over the sound-opening in said piece, so as to close the inner portion thereof.

H is a thin metal armature-plate permanently attached to the face of the membrane, so that said membrane presents to the magnet of the receiver a magnetic material, and may therefore be made to vibrate when pulsations are produced in the attractive power of the magnet by pulsations in the electric current in its helix.

R is the sound-opening in the end of the frame or holder of the receiver, inclosed on the side near the magnet by the membrane, so that the sounds emitted by the membrane may be received by the ear of the listener.

The receiving-diaphragm can be removed from the frame G at pleasure and without derangement to its proper form or tension, so that when replaced it will be of the proper stiffness to vibrate and produce sounds, and its inner face will be presented in proper relation to the poles of the magnet without any special manipulation or adjustment. It also constitutes a distinct and separate element of the instrument, that may be transported without derangement, and when it is placed in position against the inner face of the end piece its face or surface will be presented in proper condition and relation to the magnet, which acts upon it so that it may immediately be put to use and made to vibrate and produce sounds.

G' is the magnet, surrounded by a helix of insulated wire, and connected to the instrument immediately in rear of the membrane F, and at a point near its center.

To each of the plates C C is connected a wire, J, one of which is connected with a battery, K, and the other with the line-wire L. To each of the poles of the magnet is connected a wire, M, one of which is connected with the battery K and the other to the line-wire, as shown in Fig. 1, by means of connecting-posts N N, mounted or fixed in the frame.

The operation of my telephone apparatus is as follows: The transmitting-membrane being at rest, the circuit-controller rests upon the plates and completes the circuit of the electric battery through the helix of the receiving apparatus. The said membrane, being sensitive to sound-vibrations produced in its vicinity, is made to vibrate thereby, and the circuit-controller resting upon the plates is also caused to vibrate, thus producing electrical pulsations in the helix of the receiver and causing the diaphragm of the receiver to vibrate in response to the sound-vibrations acting upon the transmitter.

Having now fully described my invention of a telephone apparatus, as shown and set forth in the drawings and specifications filed in the Patent Office April 10, 1876, I wish it to be understood that in this present division of my application I make no claim to the combination of a diaphragm-receiver with a diaphragm-transmitter; nor do I in this present division make my broad claim to my receiver, nor to the other particular inventions covered by other divisions of my original application. In this present division I do not therefore make a claim to the subject-matter claimed in the following words in my original application and in the other divisions of my application, three of which are patented under date of August 9, 1881, No. 245,534, and September 6, 1881, No. 246,800, and October 4, 1881, No. 248,002, viz:

"1. A telephone-receiver consisting of the combination, in an electric circuit, of a magnet and a diaphragm supported and arranged in close proximity thereto, whereby sounds thrown upon the line may be reproduced accurately as to pitch and quality, substantially in the manner hereinbefore set forth.

"2. The combination, substantially as hereinbefore set forth, of a transmitting-membrane composed of vellum or any suitable material that is sensitive to the vibrations of sound, and a piece or pieces of conducting material connecting with the same, and receiving from it vibrations less in extent than its extreme range of vibration, with a circuit-controller which, when at rest, has points of contact with said conducting piece or pieces, making part of an electric circuit through them and the battery, and which receives from the membrane, when in motion, said reduced vibrations in accord with the waves of air producing sound, and thereby causes impulses in the electric current through the said conducting piece or pieces, all constructed and operating substantially in the manner described.

"3. The combination, substantially as hereinbefore set forth, of a magnet, a helix, and a receiving-membrane, a portion of the face of which presents a material attached to and supported wholly by the membrane, capable of being attracted by the magnet and in close proximity thereto, with connecting-wires, a voltaic battery, and a transmitting-membrane, conducting-pieces connecting thereto and to the circuit-wires, a circuit-controller resting upon said pieces and entirely supported thereby and arranged to vibrate in connection with the membrane, and a regulating-nut to limit the movement of the controller with relation to such contact-piece, all combined to operate in the manner set forth, so that the said controller, when at rest, completes the circuit of the battery, and when in motion by means of sound-waves causes electrical pulsations in the connecting-wires and helix around the magnet and vibrations of the membrane of the receiver.

"4. The combination, substantially as hereinbefore set forth, for a telephone receiving apparatus, of a helix and magnet and connecting-posts, to which the wires of the helix are joined, mounted in one end of the frame or holder, of wood or such like insulating material, a membrane mounted on the opposite end of said frame or holder, a portion of the face of which membrane presents a material attached to and supported wholly thereby, capable of being attracted by the magnet, and in close proximity thereto, so that the said membrane shall be caused to vibrate by the action of pulsations in an electric current in the helix around the magnet, with a sound-recess at the opposite side of the membrane from the magnet, to confine the sounds received therein and exclude exterior sounds from the ear of the listener, and adapted at the same time to allow the ear of the listener to be placed in close proximity to the membrane, all constructed and arranged to operate substantially in the manner described.

"5. Broadly, the art of transmitting articulate speech by electricity.

"6. Broadly, a variable-resistance contact-transmitter for electro-speaking telephones.

"7. Broadly, a magneto-receiver for electro-speaking telephones.

"8. The combination, substantially as hereinbefore set forth, of a transmitting-membrane composed of vellum, or any suitable material that is sensitive to the vibrations of sound, and two pieces of conducting material attached to and receiving motion from the same, and included in an electric circuit, a circuit-controller resting upon said plates, and means, as shown and described, for adjustably limiting the vibrations of the controller with relation to said plates, the whole combined to operate substantially in the manner and for the purposes set forth."

What I do claim in this division as part of my whole invention, and desire to secure by Letters Patent, is—

The combination, substantially as hereinbefore set forth, for a telephone-receiver, of a frame or holder, an electro-magnet, a diaphragm carrying upon its face near the magnet a piece of magnetic material, and secured to a rigid circumferential supporting band or rim, said band or rim, with its attached diaphragm, being removably held in the frame or holder, all as set forth, so that the diaphragm may be removed and replaced together with its band or rim, or separately transported, and when in place may be immediately put to use and made to vibrate and produce sounds.

JAMES W. McDONOUGH.

Witnesses:
JOSEPH A. SMITH,
W. L. BENNEM.